US008928766B2

(12) United States Patent
Hu et al.

(10) Patent No.: US 8,928,766 B2
(45) Date of Patent: Jan. 6, 2015

(54) ANTI-SHAKE DEVICE FOR A LENS MODULE

(75) Inventors: Chao Chang Hu, Taoyuan County (TW); Shu Shan Chen, Taoyuan County (TW)

(73) Assignee: TDK Taiwan, Corp. (TW)

( * ) Notice: Subject to any disclaimer, the term of this patent is extended or adjusted under 35 U.S.C. 154(b) by 728 days.

(21) Appl. No.: 13/068,382

(22) Filed: May 9, 2011

(65) Prior Publication Data

US 2012/0182436 A1 Jul. 19, 2012

(30) Foreign Application Priority Data

Jan. 14, 2011 (TW) .............................. 100101364 A

(51) Int. Cl.
 *H04N 5/228* (2006.01)
 *H04N 5/225* (2006.01)
 *H04N 5/232* (2006.01)
 *G03B 5/00* (2006.01)
(52) U.S. Cl.
 CPC ......... *H04N 5/2254* (2013.01); *H04N 5/23287* (2013.01); *G03B 5/00* (2013.01); *G03B 2205/0061* (2013.01)
 USPC ....................... 348/208.99; 348/360; 348/375

(58) Field of Classification Search
 USPC ................... 348/208.99, 208.1, 208.3–208.5
 See application file for complete search history.

(56) References Cited

U.S. PATENT DOCUMENTS

| 8,049,971 | B2* | 11/2011 | Jung et al. ..................... 359/694 |
| 8,238,736 | B2* | 8/2012 | Tsuruta et al. .................. 396/55 |
| 2005/0270379 | A1* | 12/2005 | Seo ............................. 348/208.5 |
| 2007/0188051 | A1* | 8/2007 | Kobayashi et al. ...... 310/323.11 |
| 2009/0231450 | A1* | 9/2009 | Tanaka et al. ............... 348/208.7 |
| 2010/0110270 | A1* | 5/2010 | Sekimoto et al. ............ 348/340 |
| 2014/0092265 | A1* | 4/2014 | Hsu et al. .................. 348/208.7 |

* cited by examiner

Primary Examiner — Twyler Haskins
Assistant Examiner — Carramah J Quiett

(57) ABSTRACT

An anti-shake device furnished between a lens module and an image sensor. An optical path is defined along the lens module and image sensor. The anti-shake device comprises a base plate, at least one piezoelectric member and a circuit member. The base plate is located in the optical path and has a surface facing the lens module, wherein a first axial direction and a second axial direction are defined on the surface. The piezoelectric member is located on the base plate and contacts with the lens module. The circuit member located on the base plate comprises a control module for controlling the piezoelectric member to drive the lens module moving alone the first and second axial directions in order to adjust the deviation caused by shaking.

17 Claims, 8 Drawing Sheets

A-A section

ANTI-SHAKE DEVICE FOR A LENS MODULE

BACKGROUND OF THE INVENTION

1. Field of the Invention

The invention relates to an anti-shake device for a lens module, and more particularly to the device that introduces a piezoelectric motor to compensate possible position deviation on the optical path between the lens module and the image sensor.

2. Description of the Prior Art

In a conventional optical system composed of a lens module and an image sensor, such as a photo camera, a video camera and so on, imaging quality is vulnerable to unexpected hand-shaking or some other external reasons which would lead to shift or deviate the imaging from its ordinary or correct optical path. A typical solution toward resolving the foregoing problem is to introduce a compensating mechanism that can correct the image-capturing of the camera so as to obtain a satisfied and clear image. In the art, such a compensating mechanism is usually achieved by a digital or optical-compensating device.

The so-called digital compensating mechanism is introduced to further analyze and process the raw image data captured by the image sensor, such that a clearer digital image can thus be obtained. The aforesaid compensating mechanism may be sometimes called as a digital anti-shake mechanism. On the other hand, the optical-compensating mechanism, also called as the optical anti-shake mechanism, is to achieve its designer goal by adding an anti-shake unit onto the lens module or the image sensor. Anyhow, the current optical anti-shake mechanisms in the marketplace are usually apparatuses composed of complicated and cumbersome elements. The disadvantages in assembly difficulty, higher cost, and ignorable volume occupation of those optical anti-shake mechanisms are obviously clear targets needed to be immediately improved for those skill persons in the art.

SUMMARY OF INVENTION

Accordingly, it is a primary object of the present invention to provide an anti-shake device for a lens module, which includes a piezoelectric member located on a base plate to drive the lens module at two axial directions for processing compensation upon a position deviation of the lens module. The anti-shake device is also featured in concise structuring, easy assembling, tiny sizing and less costing.

In the present invention, the anti-shake device comprises a base plate, at least a piezoelectric member, a friction plate, a plurality of elastic elements and a circuit member. An optical path is defined to extend between the lens module and the image sensor.

The base plate located on the optical path further has a surface perpendicular to the optical path. A first axial direction and a second axial direction are defined on the surface. The piezoelectric member is located on the base plate and provides the lens module to sit on the top thereof. The friction plate is located to the bottom of the lens module and is to depress upon the piezoelectric members. The elastic elements extending parallel to the optical path are located to circulate around the base plate so as to maintain substantial parallel spacing between the lens module and the base plate. The circuit member is located on the base plate and electrically connected with the piezoelectric members. The circuit member further includes a control module and at least a position-detecting module connected with the control module.

According to the position deviation of the lens module from the optical path, as well as the image sensor, detected by the position-detecting module, the control module can provide relevant voltages to the piezoelectric members so as to actuate the piezoelectric members to move, along the first axial direction and the second axial direction, the lens module with respect to the base plate for compensating the position deviation caused by unexpected shaking or disturbances.

Namely, in the present invention, through the position-detecting module to calculate the position deviation of the lens module from the optical path and further, according to the detected position deviation, through the control module to precisely control the piezoelectric members to move, along two orthogonal axial directions, the friction plate fixed to the lens module so as to have the lens module shifted back to the preferable position with respect to the image sensor along the optical path.

All these objects are achieved by the anti-shake device for a lens module described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to an anti-shake device for a lens module. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

In the present invention, the anti-shake device for a lens module is to introduce a piezoelectric member (or say a piezo member) to be mounted on a base and to be used for driving the lens module to keep at a correct position by aligning along two different directions, such that a shake compensation purpose can be achieved. Preferably, the piezoelectric member can be formed as a piezoelectric motor mounted on the base plate, and a first axial direction and a second axial direction defined on the base plate are both utilized by the piezoelectric member to correct or compensate possible position or directing bias existing at the lens module. The anti-shake device for the lens module in accordance with the present invention is featured at simple structuring, easy assembling and lower costing.

As described above, the piezoelectric motor for the anti-shake device of the present invention includes a piezoelectric material to drive the motor by a voltage to generate an actuating force. The actuating force is further utilized to amend the position of the lens module to the most preferable photographic position.

In the reversible piezoelectric effect produced by the piezoelectric motor, it is defined that the "direct piezoelectric effect" is the effect of varying the material volume to produce a corresponding electric potential and, on the other hand, the "converse piezoelectric effect" is the effect of applying an electric potential to vary the material volume. Any material that poses the piezoelectric effect is called as a "piezoelectric material". The piezoelectric materials include natural crystals such as quartz, tourmaline, Rochelle salt and so on, and artificial products such as zinc oxide, polymers, ceramic materials, composite materials and so on. Among all these piezoelectric materials, the ceramic material has become the mainstream piezoelectric material for its features in easy manufacturing and easy patterning. Further, the ceramic material as the piezoelectric material is also known for its easy sizing, rapid response, tiny displacement, less power consumption and so on. For the technology of the piezoelectric motor in the art is already matured and is not the major topics of the present invention, related details are omitted herein.

Figure 1:
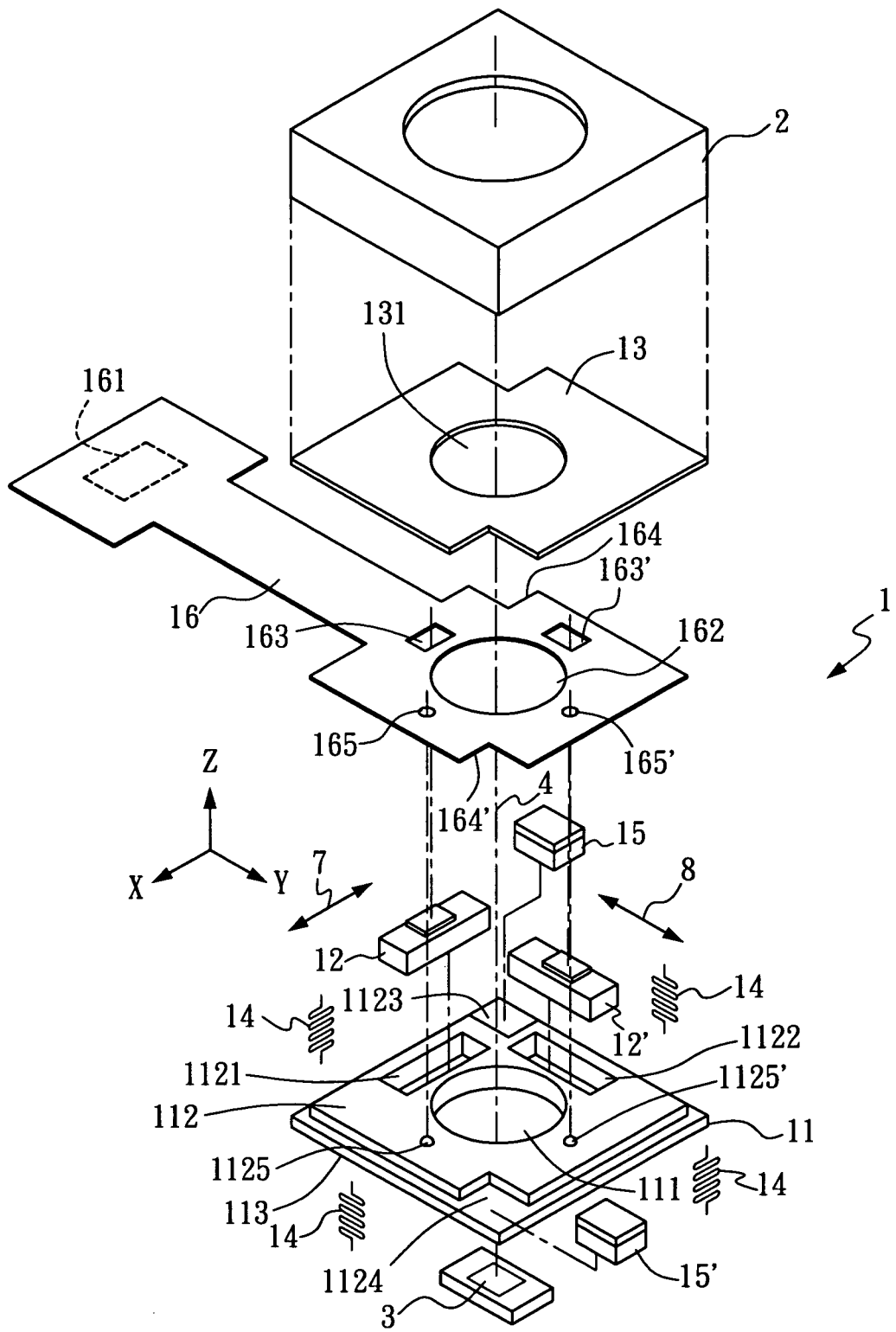
FIG. 1 is an exploded view of a preferable embodiment of the anti-shake to device for a lens module in accordance with the present invention.
Figure 2:
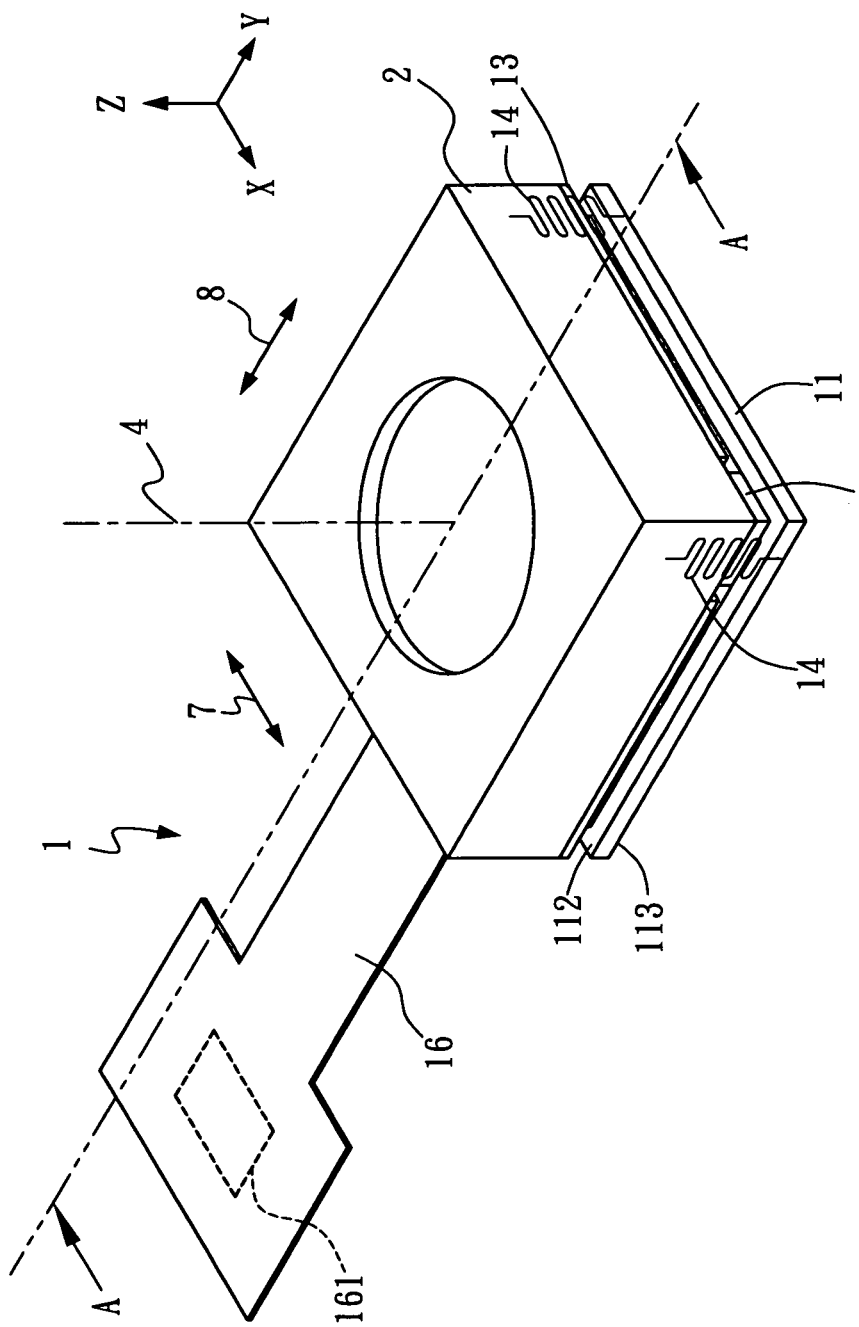
FIG. 2 is an assembly view of FIG. 1.
Figure 3:
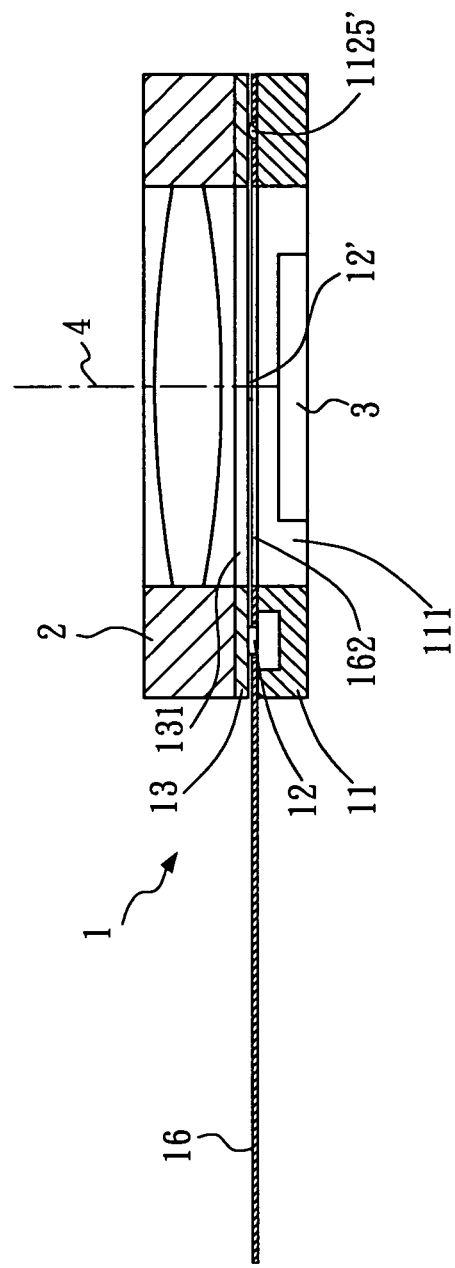
FIG. 3 is a cross-sectional view of FIG. 2 along line A-A.

Referring now to FIG. 1, FIG. 2 and FIG. 3, the anti-shake device 1 for a lens module is mainly located between the lens module 2 and an image sensor 3. An optical path 4 is defined to a center line connecting the lens module 2 and the image sensor 3, and is provided therealong for an external object to be focus-imaged at the image sensor 3.

The lens module 2 of the present invention can be a prime lens or a zoom lens that includes a plurality of lens. In the preferable embodiment as shown, the lens module 2 is a zoom lens module or a focusing lens module driven by an electromagnetic apparatus composed by a coil and magnets. On the other hand, the image sensor 3 of the present invention can include an image sensing device such as a CCD, a CMOS or any the like. By providing the lens module 2 to capture the external object and further to image along the optical path 4 to the image device of the image sensor 3, the imaging data provided by the image sensor 3 can be transformed into corresponding digital image data readable to the computer. This digital image data can also provided to a digital photo camera or a digital video camera. For the technology of the lens module 2 and the image sensor 3 is also well known in the art, details for those are omitted herein.

In the embodiment of the present invention as shown, the anti-shake device 1 is located at a middle point between the lens module 2 and the image sensor 3 and along the optical path 4. Upon such position arrangement of the anti-shake device 1, possible deviations from the correct or preferable optical path 4, caused by any external disturbance, can be compensated by the piezoelectric members of the anti-shake device 1.

As shown in FIG. 1, the preferable anti-shake device 1 includes a base plate 11, at least a piezoelectric member (two 12, 12' shown in the figure), a friction plate 13, a plurality of elastic elements 14 (four shown in the figure), at least a position-detecting module (two 15, 15' shown in the figure), and a circuit member 16. The circuit member 16 further includes a control module 161.

As shown, a penetration hole 111 is located in a central place of the base plate 11 to allow the optical path 4, extending either direction to the lens module 2 and the opposite image sensor 3, to pass therethrough. The base plate 11 further includes a first surface 112 and an opposing second surface 113. The first surface 112 is the surface facing the lens module 2, and is defined thereon a first axial direction 7 and a second axial direction 8.

In addition, the first surface 112 further includes a first groove 1121 located along the first axial direction 7, and a second groove 1122 located along the second axial direction 8 and namely perpendicular to the first groove 1121. The first groove 1121 and the second groove 1122 are to accommodate respectively the piezoelectric members 12 and 12' in a manner of having tops of the piezoelectric members 12 and 12' close to the friction plate 13 attached to a bottom of the lens module 2. Namely, the first axial direction 7 and the second axial direction 8 stand respectively for the X axis and the Y axis of an orthogonal X-Y-Z coordinate system on the first surface 112 of the base plate 11. In addition, the optical path 4 is the Z axis of the coordinate system. In the preferable embodiment of the present invention as shown in FIG. 1 through FIG. 3, the piezoelectric members 12 and 12' are both the piezoelectric motors with a preferable operational frequency at about 120 KHz or another workable frequency, and are respectively in charge of the shifting compensation of the lens module 2 at the first axial direction 7 and the second axial direction 8. In this embodiment, when the piezoelectric member 12 is applied by a proper voltage, the piezoelectric motor 12 can drive the lens module 2 to undergo a linear movement along the second axial direction 8. Similarly, when an appropriate voltage is applied to the piezoelectric motor 12', the lens module 2 can be moved along the first axial direction 7 to a corresponding displacement. Upon such an arrangement, the deviation of the optical path 4 can be compensated to photographically correct by appropriately adjusting the X-Y position of the lens module 2, which is achieved by applying relevant voltages to the piezoelectric members 12 and/or 12'.

The second surface 113 of the base plate 11 is to cover the image sensor 3. Through the penetration hole 111 of the base plate 11, the optical path 4 can connect, in a photographic view, the lens module 2 and the image sensor 3, located to either sides of the base plate 11.

As shown in FIG. 1, a first locating structure 1123 (formed as a square cutoff corner) and a second locating structure 1124 (formed as another square cutoff corner) for firmly engaging respectively two position-detecting modules 15 and 15' are positioned at respective predetermined locations, opposite to each other, along two lateral sides of the first surface 112 of the base plate 11. The position-detecting module 15 and 15' are used to calculate the displacement bias of the lens module 2 from the optical path 4; i.e., the individual deviations of the first axial direction 7 and the second axial direction 8 from the optical path 4 at the lens module 2. These deviations upon the lens module 2 are compensated by actuating the piezoelectric members 12 and 12' through the control module 161 on the base plate 11. Upon such an arrangement, the lens module 2 and the image sensor 3 can resume the preferable relative positions along the optical path 4.

The friction plate 13 is located to the bottom surface of the lens module 2, where the bottom surface is the surface of the lens module 2 facing the first surface 112 of the base plate 11. The friction plate 13 is elastically depressed upon the piezoelectric members 12 and 12' so as to increase the contact friction between the lens module 2 and the piezoelectric members 12 and 12'. As shown, a central penetration hole 131 is formed at the friction plate 13 for allowing the optical path 4 to pass therethrough. In this embodiment, four elastic elements 14, each of which can be formed as a spring bent from a long slender metal sheet, are included between the lens module 2 and the base plate 11 so as to elastically and evenly suspend the lens module 2 over the first surface 112 of the base plate 11. Preferably, these four elastic elements 14 are fixed to four side-surfaces of the base plate 11 respectively; and more preferably, these four elastic elements 14 are located at predetermined places close respectively to corners of the base plate 11. By applying these elastic elements 14 extending along the optical path 4 (i.e., the Z axis) to peripherally and elastically position the lens module 2 on the base plate 11, the lens module 2 can be thus waived from possible slip-off from the base plate 11 by any shake or disturbance. Also, the elastic elements 14 can provide a preset contact pressure between the friction plate 13 and the piezoelectric members 12 and 12' so as to exist a substantial friction restraint in between to allow the piezoelectric members 12 and 12' able to drive horizontally the lens module 2. In addition, the elastic element 14 formed as a bent-blade spring can be utilized as a part of the circuitry to electrically connect the lens module 2 and the circuit member 16 and to transmit control signals in between for driving the lens module 2 to focus, zoom and process any operation.

In this embodiment, the circuit member 16 can be a flexible circuit board mounted on the base plate 11 at a place between the lens module 2 and the base plate 11. An opening 162 is included in the circuit member 16 to correspond to the penetration hole 111 and also to allow the optical path 4 to pass therethrough. As shown in FIG. 1, the circuit member 16 further includes two slot openings 163 and 163' and two cutoff corners 164 and 164' for the aforesaid two piezoelectric members 12 and 12' on the base plate 11 and the aforesaid two position-detecting modules 15 and 15' to pass therethrough, respectively to further contact at the lens module 2 for follow-up deviation-compensation operations. In the present embodiment, the position-detecting module 15 or 15' can be a magnetic position-detecting module including magnetic sensors, and magnets corresponding to the position-detecting module 15 and 15' are located at the bottom surface of the lens module 2. By providing the magnetic sensors to detect the magnetic change from the shifting of the magnets, the position (deviation) displacements of the lens module 2 upon the first and the second axial directions 7, 8 can then be calculated by the control module 161 of the circuit member 16. In another embodiment, the position-detecting module 15 or 15' can be an optical position-detecting module including light-emitting sensors, and light-reflection elements corresponding to the position-detecting module 15 and 15' are located at the bottom surface of the lens module 2. By providing the light-emitting sensors to detect the changes in the reflection lights from the light-reflection elements, the position (deviation) displacements of the lens module 2 upon the first and the second axial directions 7, 8 can thus be calculated by the control module 161 of the circuit member 16.

The circuit member 16 is electrically connected with the piezoelectric members 12 and 12' and the position-detecting modules 15 and 15'. With the position-detecting modules 15 and 15' to detect the position deviation of the lens module 2 from the optical path 4, the control module 161 of the circuit member 16 can deduce a compensation value from the position deviation. Further, in accordance with the compensation value, the piezoelectric members 12 and 12' are controlled by relevant voltages to drive the lens module 2 to shift properly at the first axial direction 7 and the second axial direction 8 so as to have the lens module 2 back to the preferable position with the image sensor 3 along the optical path 4.

In addition, to account for possible obliqueness upon the lens module 2 caused by the contact between the friction plate 13 and the piezoelectric members 12 and 12', balance supports 1125 and 1125' are assigned to be mounted at positions on the first surface 112 of the base plate 11 to correspond to the positions of the piezoelectric members 12 and 12'. Also, a pair of penetration holes 165 and 165' corresponding to the positions of the balance supports 1125 and 1125' are structured to the circuit member 16 for the balance supports 1125 and 1125' to penetrate therethrough so as to have tops of the balance supports 1125 and 1125' tip at the friction plate 13. With relevant adjustment in lengths of the balance supports 1125 and 1125', the lens module 2 can pose a substantial parallel relation to the base plate 11 via spacing provided by the piezoelectric members 12 and 12' and the balance supports 1125 and 1125'. In the present invention, the balance support 1125 or 1125' can be a protrusion, a roller ball, or any the like on the first surface 112 of the base plate 11. Moreover, when the balance supports 1125 and 1125' are roller balls, these roller balls (i.e., balance supports 1125 and 1125') can reduce the friction between the balance supports 1125 and 1125' and the friction plate 13, and thus the piezoelectric members 12 and 12' will be able to move the lens module 2 more easily.

In the following descriptions toward other embodiments of the present invention, elements in these following embodiments that are the same as those described in the previous preferable embodiment would be given the same names and numbers, and details form these elements will be omitted. Further, elements in the following embodiments that are mainly resembled, but with slight difference, to those corresponding elements in the previous preferable embodiment would be also given the same names and numbers but with letter suffixes to the corresponding numbers.

Figure 4:
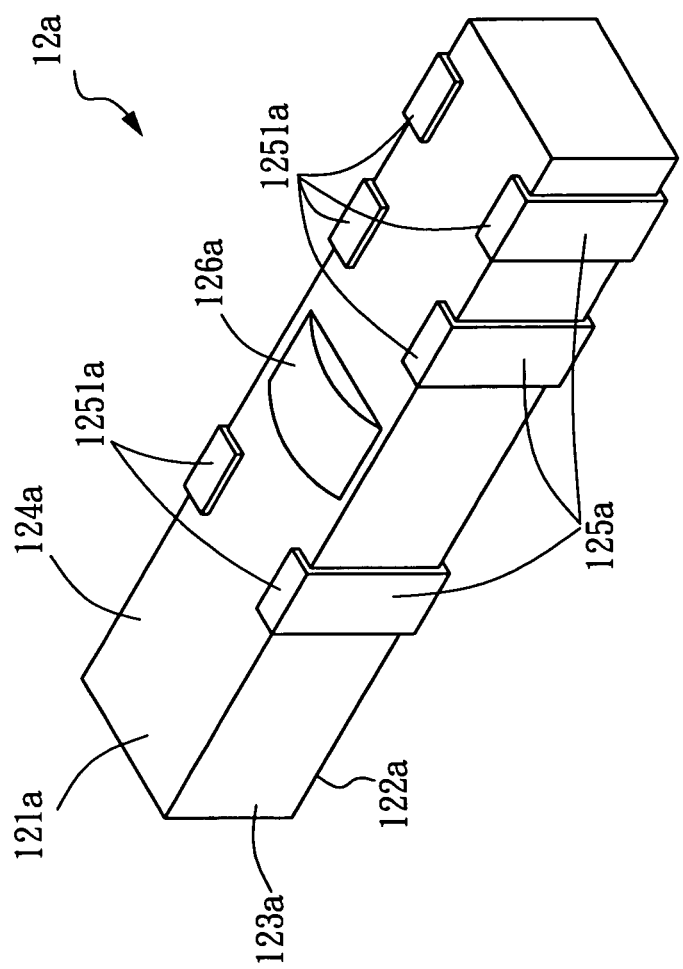
FIG. 4 is a perspective view of a piezoelectric member for a first embodiment of the anti-shake device for a lens module in accordance with the present invention.
Figure 5:
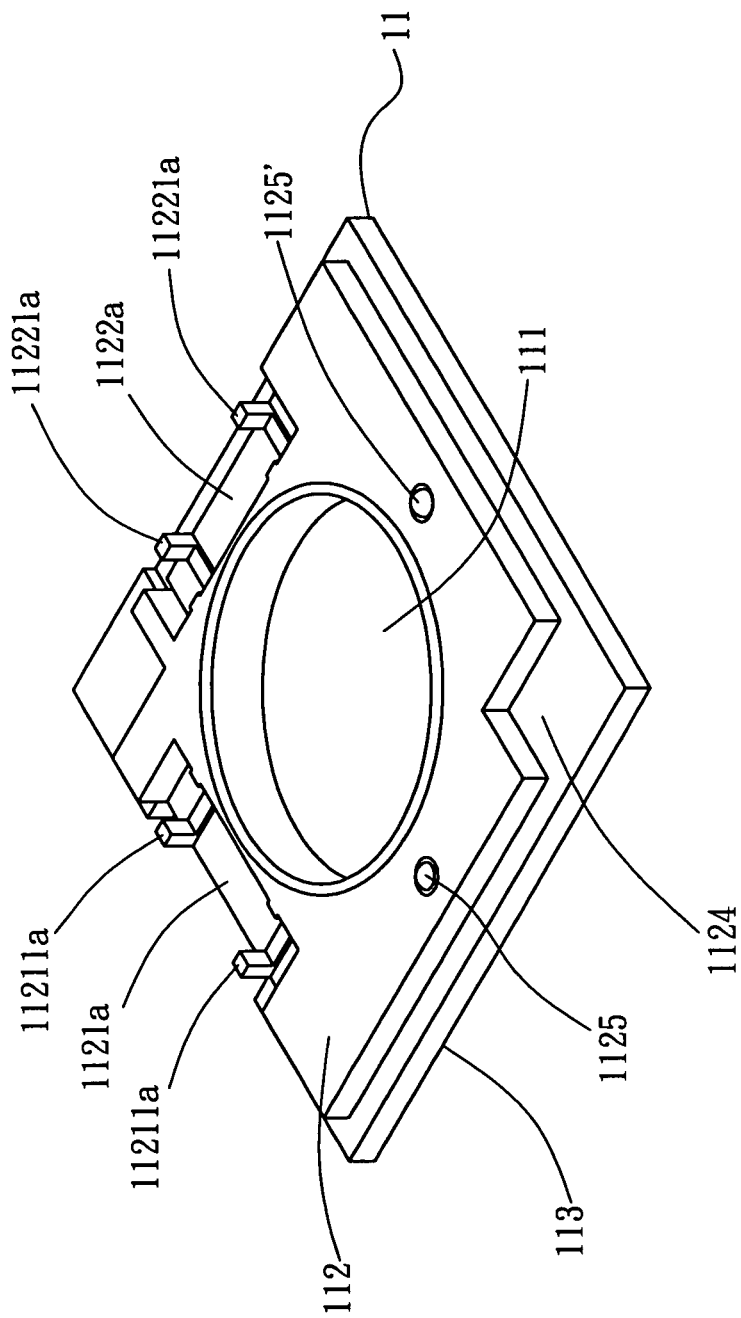
FIG. 5 is a perspective view of a base plate for the first embodiment of the anti-shake device for a lens module in accordance with the present invention.
Figure 6:
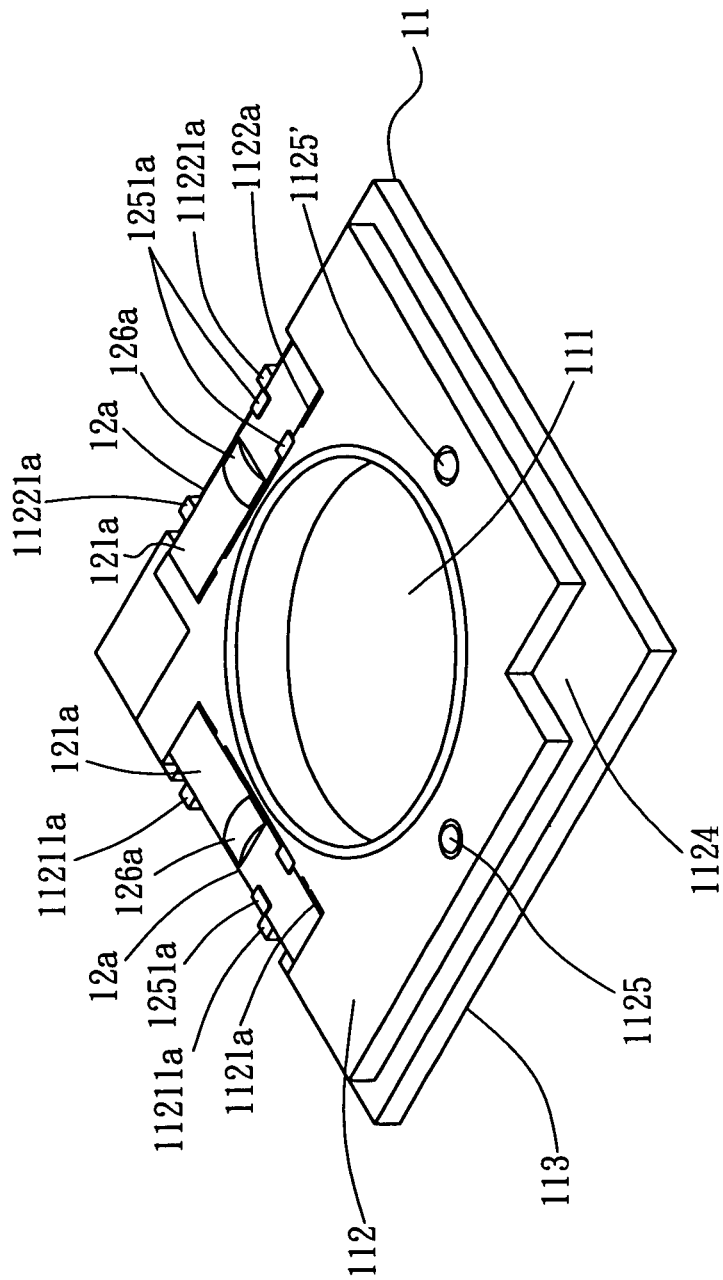
FIG. 6 is a perspective view of the assembly integrating two piezoelectric members of FIG. 4 and the base plate of FIG. 5.

Refer now to FIG. 4, FIG. 5 and FIG. 6. FIG. 4 is a perspective view of a piezoelectric member for the first embodiment of the anti-shake device for a lens module in accordance with the present invention. FIG. 5 is a perspective view of a base plate for the first embodiment of the anti-shake device for a lens module in accordance with the present invention. FIG. 6 is a perspective view of the assembly integrating two piezoelectric members of FIG. 4 and the base plate of FIG. 5.

As the embodiment shown in FIG. 4, the piezoelectric member 12a includes a contact surface 121a, a bottom surface 122a, a left lateral surface 123a, a right lateral surface 124a, a plurality of electrodes 125a, and a contact pad 126a. The contact surface 121a faces the bottom of the lens module 2. Via the slot opening 163 or 163' of the circuit member 16, the contact pad 126a on the contact surface 121a can penetrate through the circuit member 16 upwards to touch the friction plate 13 under the lens module 2. Each of the electrodes 125a located at either the left lateral surface 123a or the right lateral surface 124a further has both ends extending to be bent onto the contact surface 121a and the bottom surface 122a. As shown, the ends of the electrode 125a are formed as respective contact points 1251a for electrically connecting with the circuit member 16.

As shown in FIG. 5 and FIG. 6, the major difference between the base plate 11a of this first embodiment and the base plate 11 of FIG. 1 is that the first groove 1121a and the second groove 1122a on the first surface 112a of the base plate 11a are formed as open grooves that are empty at the corresponding exterior sides. Also, at the empty or the lateral open side of the first groove 1121a or the second groove 1122a, a corresponding pair of clamp elements 11211a or 11221a, respectively, are located to hold corresponding one of the piezoelectric members 12a fixedly inside the first groove 1121a or the second groove 1122a. While the piezoelectric member 12a is anchored in the corresponding groove 1121a or 1122a, the bottom surface 122a is to sit onto the groove 1121a or 1122a, the pair of the clamp elements 11211a or 11221a for clamping at the left lateral surface 123a or the right lateral surface 124a are located outsides to include thersinside the contact pad 126a and all the electrodes 125a at the same piezoelectric member 12a. In this embodiment, the clamp elements 11211a and 11221a form vibration nodes during motions of the piezoelectric members 12a. The actuated wavy motion of the piezoelectric member 12a is to move the contact pad 126 and further to move the friction plate 13 so as to achieve the compensation work on the X-axis and the Y-axis of the lens module 2.

Figure 7:
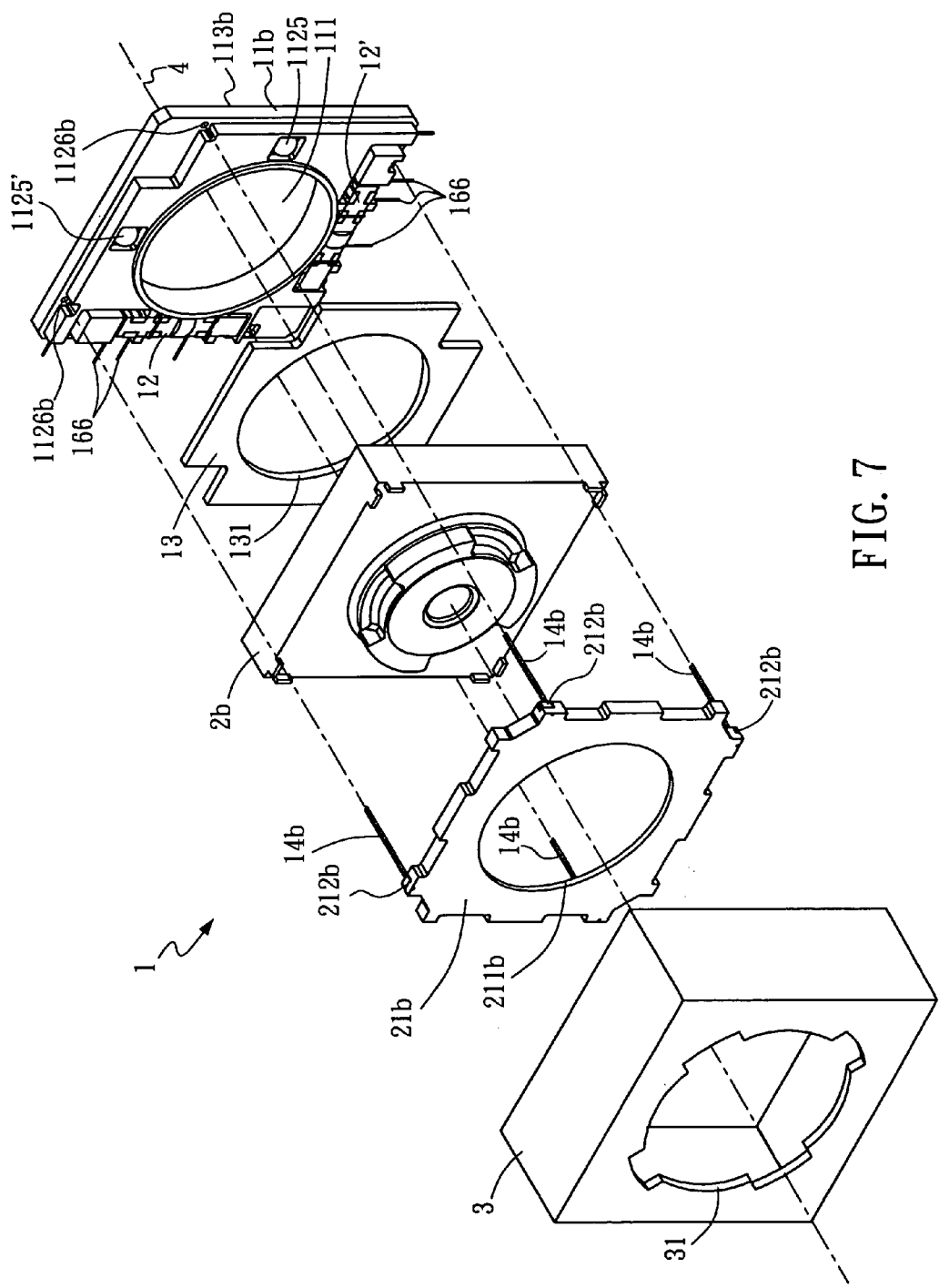
FIG. 7 is an exploded view of a second embodiment of the anti-shake device for a lens module in accordance with the present invention.
Figure 8:
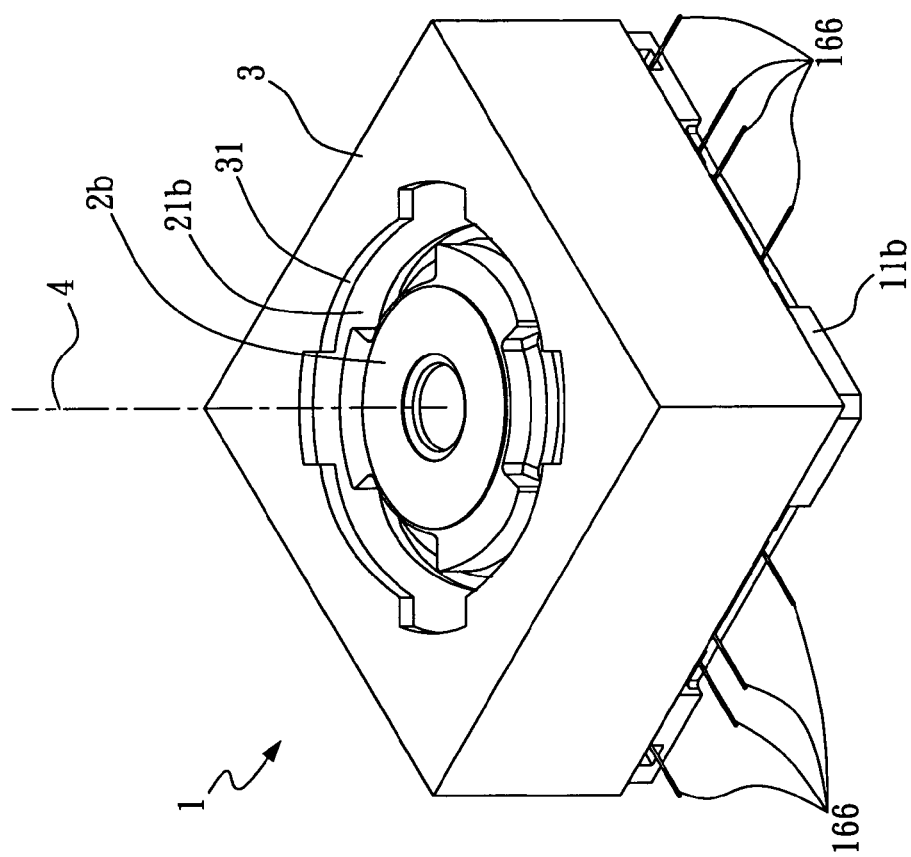
FIG. 8 is an assembly view of FIG. 7.

Refer now to FIG. 7 and FIG. 8, in which FIG. 7 is an exploded view of a second embodiment of the anti-shake device for a lens module in accordance with the present invention and FIG. 8 is the assembly view of FIG. 7.

As shown, the major difference between this second embodiment and the preferable embodiment of FIG. 1 is that the second embodiment further includes a housing 3 for shielding the lens module 2b on the base plate 11b. In addition, the housing 3 further has an opening 31 corresponding to the lens module 2b. A center of the opening 31 is arranged to sit at the optical path 4 so as to facilitate the image-capturing operation of the lens module 2b. The circuit member 16 (not shown in either FIG. 7 or FIG. 8) can be formed as a printed circuitry on the second surface 113b of the base plate 11b, or a circuitry buried inside the base plate 11b. The circuit member 16 further includes a plurality of leads 166 extending outwards to the rim of the base plate 11b. By providing the leads 166, electric power and/or control signals can be supplied to the lens module 2b and the piezoelectric members 12 and 12'.

The lens module 2b further includes a cover plate 21b having a central penetration hole 211b corresponding to the opening 31 of the housing 3 for allowing the optical path 4 to pass therethrough. As shown, a plurality of locating protrusions 212b are located to the rim of the cover plate 21b for matching in space with corresponding locating holes 1126b at the base plate 11b. One end of the elastic element 14b is connected with the locating protrusion 212b, while the other end of the elastic element 14b is connected with the locating hole 1126b. In this second embodiment of the present invention, the elastic element 14b can be metal coil spring or any other spring element. The elastic element 14b can provide a preset tension between the cover plate 21b (also the lens module 2b) and the base plate 11b. In addition, the elastic element 14b can be also utilized as a conductive path between the circuit member 16 and the lens module 2, and thus can transmit control or power signals between the lens module 2b and the circuit member 16.

In summary of the previous description upon the present invention, the anti-shake device 1 located between the lens module 2 and the image sensor 3 comprises a base plate 11, at least a piezoelectric member 12, a friction plate 13, a plurality of elastic elements, at least a position-detecting module 15 and a circuit member 16. The circuit member 16 further includes a control module 161.

The position-detecting module 15 is used to calculate the displacement bias (deviation) of the lens module 2 from the optical path 4. This deviation upon the lens module 2 can then be compensated by actuating the piezoelectric members 12 to move the friction plate 13 as well as the lens module 2, through the control module 161. In the compensation movement, the displacement deviation of the lens module 2 with respect to the base plate 11 can be adjusted by properly shifting the lens module 2 along the first axial direction 7 and the second axial direction 8. Upon such an arrangement, the lens module 2 and the image sensor 3 can resume the preferable relative positions along the optical path 4.

While the present invention has been particularly shown and described with reference to a preferred embodiment, it will be understood by those skilled in the art that various changes in form and detail may be without departing from the spirit and scope of the present invention.

What is claimed is:

1. An anti-shake device for a lens module, the anti-shake device being located between a lens module and an image sensor, the anti-shake device comprising:

a base plate, having a surface perpendicular to an optical path defined between the lens module and the image sensor; wherein a first axial direction and a second axial direction perpendicular to the first axial direction are defined on the surface;

at least a piezoelectric member, located on the base plate at a position close to a bottom surface of the lens module, the piezoelectric member able to move the lens module if the piezoelectric member is actuated by a voltage; wherein said at least a piezoelectric member comprises two piezoelectric motors positioned perpendicularly on said surface of said base plate to be in charge of deviation compensations upon said lens module with respect to said base plate along said first axial direction and said second axial direction, respectively; wherein each of the two piezoelectric motors includes a contact surface, a plurality of electrodes and a contact pad;

a circuit member, located on the base plate, electrically connected with said two piezoelectric motors, further comprising a control module for providing the voltage to the two piezoelectric motors;

at least a position-detecting module located on said surface of said base plate for detecting a position deviation of said lens module from said optical path; wherein said control module on said base plate is able to actuate said two piezoelectric motors to move said lens module so as to compensate the position deviation; and a friction plate mounted to said bottom surface of said lens module, the friction plate being elastically depressed upon each top of said two piezoelectric motors so as to increase friction between said lens module and said two piezoelectric motors;

wherein the surface of base plate is formed with a first groove located along the first axial direction and a second groove located along the second axial direction; the first groove and the second groove are to accommodate respectively the two piezoelectric motors in a manner of having tops of the two piezoelectric motors close to the friction plate attached to the bottom surface of the lens module;

wherein, each of the first groove and the second groove having a lateral side and a corresponding pair of clamp elements located at said lateral side in order to hold corresponding one of the two piezoelectric motors fixedly inside the first groove and the second groove, respectively;

wherein, when the two piezoelectric motors are respectively anchored in the first groove and the second groove, the electrodes of each of two piezoelectric motors are respectively electrically connecting with the circuit member located on the base plate, in addition, the pair of the clamp elements form vibration nodes during motions of each of two piezoelectric motors.

2. The anti-shake device for a lens module according to claim 1, further including a plurality of elastic elements located between said lens module and said base plate for maintaining substantial spacing between said lens module and said base plate, wherein, said elastic elements are fixed to side-surfaces of the base plate respectively.

3. The anti-shake device for a lens module according to claim 2, wherein each said elastic element is fixed to a respective corner of said base plate and extended along a direction parallel to said optical path.

4. The anti-shake device for a lens module according to claim 1, further including two balance supports mounted at positions on the base plate to correspond to the positions of the piezoelectric motors in such a manner that, not only the lens module can pose a substantial parallel relation to the base plate, but also the friction between the balance supports and the friction plate can be reduced.

5. The anti-shake device for a lens module according to claim 4, wherein said balance support is a roller ball.

6. The anti-shake device for a lens module according to claim 1, wherein said lens module is selected from the group of a zoom lens module and a focusing lens module; wherein said image sensor is selected from the group of a CCD module and a CMOS module; and wherein said circuit member is selected from the group of a circuitry printed on said base plate, a circuitry buried inside said base plate, and a flexible circuit board on said base plate.

7. The anti-shake device for a lens module according to claim 2, wherein said elastic element is selected from the group of a bent-blade spring and a coil spring.

8. The anti-shake device for a lens module according to claim 2, wherein each said elastic element is a spring element that provides a preset tension to pull said lens module downward to said base plate and acts as an electric-conductive path between said lens module and said circuit member for transmitting a control signal or a power signal between said lens module and said circuit member.

9. An anti-shake device for a lens module, the anti-shake device being located between a lens module and an image sensor, the anti-shake device comprising:
  a base plate, having a surface perpendicular to an optical path defined between the lens module and the image sensor; wherein a first axial direction and a second axial direction perpendicular to the first axial direction are defined on the surface;
  two piezoelectric members, located on said surface of the base plate at a position close to a bottom surface of the lens module, these two piezoelectric members being positioned perpendicularly and able, after being applied by a voltage, to move the lens module along the first axial direction and the second axial direction; wherein each of the two piezoelectric motors includes a contact surface, a plurality of electrodes and a contact pad;
  at least a position-detecting module, located on said surface of the base plate for detecting a position deviation of the lens module from the optical path;
  a circuit member, located on the base plate, electrically connected with the piezoelectric members and said at least a position-detecting module, further comprising a control module for providing the voltage to the piezoelectric member; and
  a friction plate mounted to said bottom surface of said lens module, the friction plate being elastically depressed upon each top of said two piezoelectric motors so as to increase friction between said lens module and said two piezoelectric motors;
  wherein, according to the position deviation detected by said at least a position-detecting module, the control module provides the voltage to the piezoelectric members so as to actuate the piezoelectric members to move, along the first axial direction and the second axial direction, the lens module with respect to the base plate for compensating the position deviation;
  wherein the surface of base plate is formed with a first groove located along the first axial direction and a second groove located along the second axial direction; the first groove and the second groove are to accommodate respectively the two piezoelectric motors in a manner of having tops of the two piezoelectric motors close to the friction plate attached to the bottom surface of the lens module;
  wherein, each of the first groove and the second groove having a lateral side and a corresponding pair of clamp elements located at said lateral side in order to hold corresponding one of the two piezoelectric motors fixedly inside the first groove and the second groove, respectively;
  wherein, when the two piezoelectric motors are respectively anchored in the first groove and the second groove, the electrodes of each of two piezoelectric motors are respectively electrically connecting with the circuit member located on the base plate, in addition, the pair of the clamp elements form vibration nodes during motions of each of two piezoelectric motors.

10. The anti-shake device for a lens module according to claim 9, further including a plurality of elastic elements, the plurality of elastic elements being located between said lens module and said base plate for elastically mounting said lens module above said base plate.

11. The anti-shake device for a lens module according to claim 10, wherein said elastic element is selected from the group of a bent-blade spring and a coil spring, and wherein said elastic element provides a preset tension to pull said lens module downward to said base plate and acts as an electric-conductive path between said lens module and said circuit member for transmitting a control signal or a power signal between said lens module and said circuit member.

12. The anti-shake device for a lens module according to claim 10, wherein said elastic elements are fixed to side-surfaces of the base plate respectively.

13. The anti-shake device for a lens module according to claim 12, wherein each said elastic element is fixed to a respective corner of said base plate and extended along a direction parallel to said optical path.

14. The anti-shake device for a lens module according to claim 10, further including two balance supports mounted at positions on the base plate to correspond to the positions of the piezoelectric members in such a manner that, not only the lens module can pose a substantial parallel relation to the base plate, but also the friction between the balance supports and the friction plate can be reduced.

15. The anti-shake device for a lens module according to claim 14, wherein said balance support is a roller ball.

16. The anti-shake device for a lens module according to claim 9, wherein said circuit member is selected from the group of a circuitry printed on said base plate, a circuitry buried inside said base plate, and a flexible circuit board on said base plate.

17. The anti-shake device for a lens module according to claim 9, further including a housing having an opening corresponding to said lens module, said lens module further including a cover plate having a central penetration hole corresponding to the opening of the housing for allowing said optical path to pass therethrough, the cover plate further having a plurality of locating protrusions located to a rim thereof for matching in space with corresponding locating holes at said base plate, each of said elastic elements being mounted, at both end thereof, between the respective locating protrusion and the corresponding locating hole, said circuit member further including a plurality of leads extending out to a rim of said base plate for transmitting power and control signals to said lens module and said piezoelectric members.

* * * * *